(12) United States Patent  
Contreras et al.

(10) Patent No.: US 8,598,460 B2  
(45) Date of Patent: Dec. 3, 2013

(54) INTERLEAVED CONDUCTOR STRUCTURE WITH OFFSET TRACES

(75) Inventors: John T. Contreras, Palo Alto, CA (US); Nobumasa Nishiyama, Yokohama (JP); Edgar D. Rothenberg, San Jose, CA (US); Rehan A. Zakai, San Ramon, CA (US); Yiduo Zhang, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 265 days.

(21) Appl. No.: 12/976,821

(22) Filed: Dec. 22, 2010

(65) Prior Publication Data

US 2012/0160538 A1 Jun. 28, 2012

(51) Int. Cl.
*H01B 11/00* (2006.01)

(52) U.S. Cl.
USPC ...... 174/115; 174/255; 360/245.8; 360/245.9

(58) Field of Classification Search
USPC ........................ 174/115; 360/245.9
See application file for complete search history.

(56) References Cited

U.S. PATENT DOCUMENTS

| 4,819,094 | A | 4/1989 | Oberg |
|---|---|---|---|
| 5,694,270 | A | 12/1997 | Sone et al. |
| 5,717,547 | A | 2/1998 | Young |
| 5,737,152 | A | 4/1998 | Balakrishnan |
| 5,754,369 | A | 5/1998 | Balakrishnan |
| 5,812,344 | A | 9/1998 | Balakrishnan |
| 5,862,010 | A | 1/1999 | Simmons et al. |
| 5,986,853 | A | 11/1999 | Simmons et al. |
| 5,995,328 | A | 11/1999 | Balakrishnan |
| 6,268,981 | B1 | 7/2001 | Coon et al. |
| 6,351,348 | B1 | 2/2002 | Erpelding et al. |
| 6,801,402 | B1 | 10/2004 | Subrahmanyam et al. |
| 6,839,202 | B2 | 1/2005 | Zhou |
| 6,891,700 | B2 | 5/2005 | Shiraishi et al. |
| 6,975,488 | B1 | 12/2005 | Kulangara et al. |
| 7,079,357 | B1 | 7/2006 | Kulangara et al. |
| 7,092,215 | B2 | 8/2006 | Someya et al. |
| 7,271,985 | B1 | 9/2007 | Buhler et al. |
| 7,319,573 | B2 | 1/2008 | Nishiyama |
| 8,310,789 | B2 | 11/2012 | Contreras et al. |
| 2008/0053686 | A1 | 3/2008 | Ishii et al. |
| 2009/0244786 | A1 | 10/2009 | Hatch |

FOREIGN PATENT DOCUMENTS

| JP | 53030310 | 3/1978 |
|---|---|---|
| WO | 9814937 | 4/1998 |

*Primary Examiner* — William H Mayo, III  
*Assistant Examiner* — Hiram E Gonzalez  
(74) *Attorney, Agent, or Firm* — Patterson & Sheridan, LLP (57) ABSTRACT

An interleaved conductor structure for electrically connecting the read/write electronics to a read/write head in a hard disk drive is provided. The interleaved conductor structure may allow for an increased characteristic-impedance range, greater interference shielding and a reduction of signal loss that is contributed by a lossy conductive substrate. The electrical traces may have different widths, be offset, or even wrap around each other at the via connections.

32 Claims, 7 Drawing Sheets

INTERLEAVED CONDUCTOR STRUCTURE WITH OFFSET TRACES

BACKGROUND OF THE INVENTION

1. Field of the Invention

Embodiments of the present invention generally relate to an interleaved conductor structure for electrically connecting a read/write head in a hard disk drive to the read/write electronics.

2. Description of the Related Art

Hard disk drives typically include a rotating rigid magnetic storage disk and an actuator for positioning a head slider at different radial locations relative to the axis of rotation of the disk, thereby defining numerous concentric data storage tracks on each recording surface of the disk. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

An air bearing surface on a head slider supports the head slider at a small distance away from the surface of the magnetic disk. The head slider also includes a read/write head for writing and reading data to and from the magnetic disk. The read/write head is connected by electrical wires or conductors to associated drive electronics, e.g., a proximately located preamplifier chip and downstream read channel circuitry typically carried on a circuit board (along with other circuitry) that is attached to the head/disk assembly. Single read/write head designs typically require two wire connections while dual designs having separate reader and writer elements require four wire connections. Magnetoresistive (MR) heads in particular generally require four wires. Head sliders are generally mounted to a gimbaled flexure structure attached to the distal end of a suspension's load beam structure, which in turn is connected to the actuator. A spring biases the load beam and the head slider towards the disk, while the air pressure beneath the head slider pushes the head slider away from the disk. An equilibrium distance defines an "air bearing" and determines the "flying height" of the head slider.

The disk drive industry has been progressively decreasing the size and mass of the head slider structures in order to reduce the moving mass of the actuator assembly and to permit closer operation of the transducer to the disk surface, the former giving rise to improved seek performance and the latter giving rise to improved transducer efficiency that can then be traded for higher areal density. Smaller slider structures generally require more compliant gimbals, hence the intrinsic stiffness of the conductor wires attached to the head slider can give rise to a significant undesired bias effect. To reduce the effects of this intrinsic wire stiffness or bias, structures have been proposed which include hybrid stainless steel flexure and conductive structures. Such hybrid designs typically employ stainless steel flexures having deposited insulating and conductive trace layers for electrical interconnection of the head to the associated drive electronics. Included with these integrated conductor designs is relatively short flex electronics carrier (FEC).

These hybrid flexure designs employ relatively lengthy runs of conductor trace pairs or four-wire sets which extend from bonding pads at the distal, head-mounting end of the flexure to the proximal end of the flexure. Theses traces provide a conductive path from the read/write head along the length of the associated suspension structure to the preamplifier or read-channel chip(s). Because the conductor traces are positioned extremely close to, but electrically isolated from, the conductive stainless steel flexure structure which is in turn grounded to the load beam, and because of the relatively high signal rates being transferred, the conductor trace inductance and mutual coupling, as well as conductor trace resistance and trace capacitance to ground, can give rise to unwanted signal losses, reflections, distortion, and inefficient signal/power transfer. The unwanted signal losses and reflections tend to deleteriously affect the performance of the read/write head, interconnect structure, and driver/preamplifier circuit.

SUMMARY OF THE INVENTION

The present invention generally provides for an interleaved conductor structure for electrically connecting a read/write head in a hard disk drive. The disclosed interleaved conductor structure allows for an increased characteristic-impedance range, greater interference shielding and a reduction of signal loss that is contributed by a lossy conductive substrate.

In one embodiment, an interleaved conductor structure includes a conductive underlayer, a first electrical insulation layer disposed over the conductive underlayer, and a first plurality of electrical traces disposed on the first electrical insulation layer. Each electrical trace of the first plurality of electrical traces has a first width. The structure also includes a second electrical insulation layer disposed on the first plurality of electrical traces and a second plurality of electrical traces disposed on the second electrical insulation layer. Each electrical trace of the second plurality of electrical traces has a second width that is different than the first width. The first and second plurality of electrical traces each include negative and positive phase traces, and the first plurality of electrical traces are interleaved relative to the second plurality of electrical traces.

In another embodiment, an interleaved conductor structure includes a conductive underlayer, a first electrical insulation layer disposed over the conductive underlayer, and a first plurality of electrical traces disposed on the first electrical insulation layer. Each electrical trace of the first plurality of electrical traces has a first width. The structure also includes a second electrical insulation layer disposed on the first plurality of electrical traces and a second plurality of electrical traces disposed on the second electrical insulation layer. Each electrical trace of the second plurality of electrical traces has a second width that is different than the first width. The first and second plurality of electrical traces each include negative and positive phase traces. The first plurality of electrical traces are interleaved relative to the second plurality of electrical traces. The structure also includes a third electrical insulation layer disposed on the second plurality of electrical traces and a top conductive shield layer disposed on the third electrical insulation layer.

In another embodiment, an interleaved conductor structure includes a conductive underlayer, a first electrical insulation layer disposed over the conductive underlayer, and a first plurality of electrical traces disposed on the first electrical insulation layer. Each electrical trace of the first plurality of electrical traces has a first width. The structure also includes a second electrical insulation layer disposed on the first plurality of electrical traces and a second plurality of electrical traces disposed on the second electrical insulation layer. Each electrical trace of the second plurality of electrical traces has a second width that is different than the first width. The structure also includes a third electrical insulation layer disposed on the second plurality of electrical traces and a third plurality of electrical traces disposed on the third electrical insulation layer. Each electrical trace of the third plurality of electrical traces has a third width that is different than at least one of the first width and the second width. The first, second and third plurality of electrical traces each include negative and positive phase traces. The first plurality of electrical traces are interleaved relative to the second plurality of electrical traces and the second plurality of electrical traces are interleaved relative to the third plurality of electrical traces.

In another embodiment, an interleaved conductor structure includes a conductive underlayer, a first electrical insulation layer disposed over the conductive underlayer, and a first plurality of electrical traces disposed on the first electrical insulation layer and spaced apart by a first distance. Each electrical trace of the first plurality of electrical traces has a first width. The structure also includes a second electrical insulation layer disposed on the first plurality of electrical traces and a second plurality of electrical traces disposed on the second electrical insulation layer and spaced apart by a second distance that is substantially equal to the first distance. Each electrical trace of the second plurality of electrical traces has a second width, wherein each electrical trace of the second plurality of electrical traces is offset from each electrical trace of the first plurality of electrical traces. The first and second plurality of electrical traces each include negative and positive phase traces, and the first plurality of electrical traces are interleaved relative to the second plurality of electrical traces.

In another embodiment, an interleaved conductor structure includes a conductive underlayer, a first electrical insulation layer disposed over the conductive underlayer, and a first plurality of electrical traces disposed on the first electrical insulation layer and spaced apart by a first distance. Each electrical trace of the first plurality of electrical traces has a first width. The structure also includes a second electrical insulation layer disposed on the first plurality of electrical traces and a second plurality of electrical traces disposed on the second electrical insulation layer and spaced apart by a second distance substantially equal to the first distance. Each electrical trace of the second plurality of electrical traces is offset from each electrical trace of the first plurality of electrical traces. The first and second plurality of electrical traces each include negative and positive phase traces, and the first plurality of electrical traces are interleaved relative to the second plurality of electrical traces. The structure also includes a third electrical insulation layer disposed on the second plurality of electrical traces and a top conductive shield layer disposed on the third electrical insulation layer.

In another embodiment, an interleaved conductor structure includes a conductive underlayer having at least one aperture extending therethrough, a first conductive layer disposed on the conductive underlayer, a first electrical insulation layer disposed on the first conductive layer, and a first plurality of electrical traces disposed on the first electrical insulation layer and spaced apart by a first distance. Each electrical trace of the first plurality of electrical traces has a first width. The structure also includes a second electrical insulation layer disposed on the first plurality of electrical traces and a second plurality of electrical traces disposed on the second electrical insulation layer and spaced apart by a second distance substantially equal to the first distance. Each electrical trace of the second plurality of electrical traces is offset from each electrical trace of the first plurality of electrical traces. The first and second plurality of electrical traces each include negative and positive phase traces, and the first plurality of electrical traces are interleaved relative to the second plurality of electrical traces. The structure also includes a third electrical insulation layer disposed on the second plurality of electrical traces and a top conductive shield layer disposed on the third electrical insulation layer.

In another embodiment, an interleaved conductor structure includes a conductive underlayer, a first electrical insulation layer disposed over the first conductive layer, a first positive phase electrical trace disposed on the first electrical insulation layer having a first end and a second end, and a first negative phase electrical trace disposed on the first electrical insulation layer having a third end and a fourth end and spaced apart from the first positive phase electrical trace. The structure also includes a second electrical insulation layer disposed on the first positive phase electrical trace and the first negative phase electrical trace. The structure also includes a second positive phase electrical trace disposed on the second electrical insulation layer, vertically aligned with the first negative phase electrical trace and having a fifth end vertically aligned with the first end and a sixth end vertically aligned with the second end. The structure also includes a second negative phase electrical trace disposed on the second electrical insulating layer and having a seventh end and an eighth end and spaced apart from the second positive phase electrical trace.

In another embodiment, an interleaved conductor structure includes a conductive underlayer, a first electrical insulation layer disposed over the conductive underlayer, a first positive phase electrical trace disposed on the first electrical insulation layer having a first end and a second end, and a first negative phase electrical trace disposed on the first electrical insulation layer having a third end and a fourth end and spaced apart from the first positive phase electrical trace. The structure also includes a second electrical insulation layer disposed on the first positive phase electrical trace and the first negative phase electrical trace. The structure also includes a second positive phase electrical trace disposed on the second electrical insulation layer, vertically aligned with the first negative phase electrical trace and having a fifth end vertically aligned with the first end and a sixth end vertically aligned with the second end. The structure also includes a second negative phase electrical trace disposed on the second electrical insulating layer and having a seventh end and an eighth end and spaced apart from the second positive phase electrical trace, a third electrical insulation layer disposed on the second positive phase electrical trace and the second negative phase electrical trace, and a third positive phase electrical trace disposed on the third electrical insulation layer, vertically aligned with the first positive phase electrical trace and having a ninth end vertically aligned with the first end and a tenth end vertically aligned with the second end. The structure also includes a third negative phase electrical trace disposed on the third electrical insulating layer and having an eleventh end and a twelfth end and spaced apart from the third positive phase electrical trace.

In another embodiment, an interleaved conductor structure includes a conductive underlayer, a first electrical insulation layer disposed over the conductive underlayer, a first positive phase electrical trace disposed on the first electrical insulation layer having a first end and a second end, and a first negative phase electrical trace disposed on the first electrical insulation layer having a third end and a fourth end and spaced apart from the first positive phase electrical trace. The structure also includes a second electrical insulation layer disposed on the first positive phase electrical trace and the first negative phase electrical trace. The structure also includes a second positive phase electrical trace disposed on the second electrical insulation layer, vertically aligned with the first negative phase electrical trace and having a fifth end vertically aligned with the first end and a sixth end vertically aligned with the second end. The structure also includes a second negative phase electrical trace disposed on the second electrical insulating layer and having a seventh end and an eighth end and spaced apart from the second positive phase electrical trace and a third electrical insulation layer disposed on the second positive phase electrical trace and the second negative phase electrical trace. The structure also includes a third positive phase electrical trace disposed on the third electrical insulation layer, vertically aligned with the first positive phase electrical trace and having a ninth end vertically aligned with the first end and a tenth end vertically aligned with the second end. The structure also includes a third negative phase electrical trace disposed on the third electrical insulating layer and having an eleventh end and a twelfth end and spaced apart from the third positive phase electrical trace, a fourth electrical insulation layer disposed on the third positive phase electrical trace and the third negative phase electrical trace, and a fourth positive phase electrical trace disposed on the fourth electrical insulation layer, vertically aligned with the third negative phase electrical trace and having a thirteenth end vertically aligned with the first end and a fourteenth end vertically aligned with the second end. The structure also includes a fourth negative phase electrical trace disposed on the fourth electrical insulating layer and having a fifteenth end and an sixteenth end and spaced apart from the fourth positive phase electrical trace.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention provides an interleaved conductor structure for electrically connecting a read/write head in a hard disk drive. In some embodiments, the disclosed interleaved conductor structure allows for an increase in manufacturing tolerance in the alignment of stacked layers of the structure. Additionally, the periodic offset provides wider characteristic-impedance ranges. The periodic offset of the traces allows for more control over the final impedance as the final design is determined. In order to keep the relative same propagation velocity, the offset of the traces is periodic.

Figure 1:
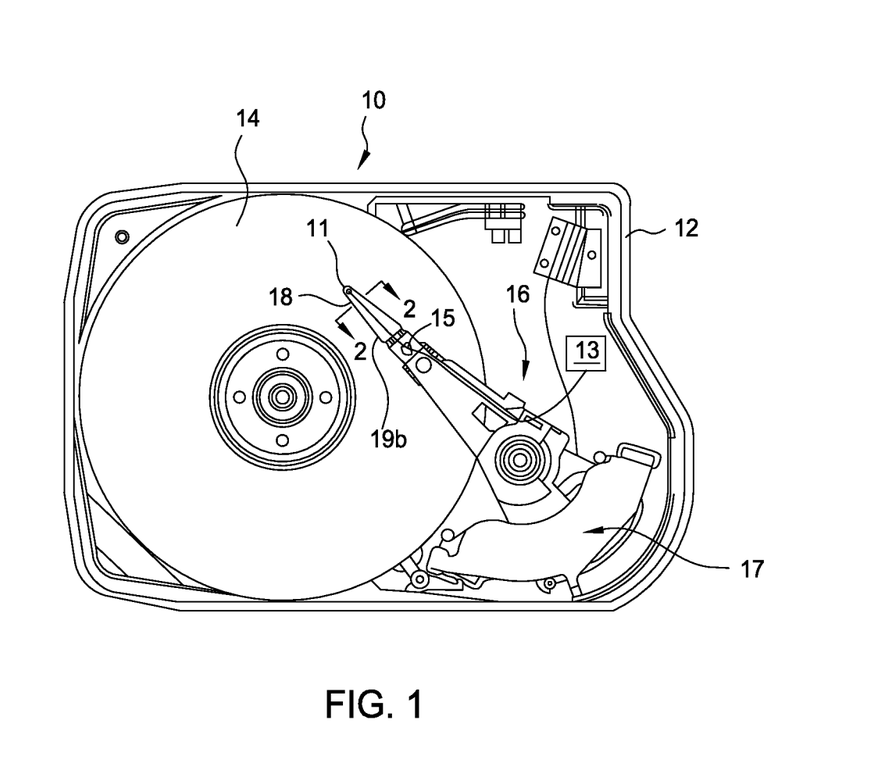
FIG. 1 shows a disk drive having a magnetic disk, and a head slider with a magnetic read/write head mounted on an actuator, according to an embodiment of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 includes a head element 11 that accesses a recording area of the magnetic disk 14 and a slider to which the head element 11 is fixed. The head slider 18 is provided with a fly-height control which adjusts the flying height of the head above the magnetic disk 14. An actuator 16 carries the head slider 18 and includes an elongated conductive suspension member 19b. The elongated conductive suspension member 19b is flexible to provide a spring action to the actuator 16 and, in one embodiment, is formed from a non-corrosive metal such as stainless steel. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the elongated conductive suspension member 19b toward the magnetic disk 14. As shown in the FIG. 1, the elongated conductive suspension member 19b acts as an integrated conductive underlayer for the electrical connection assembly 15 providing structural support. The conductive underlayer can also be constructed with a stiffener layer of conductive material such as aluminum, copper, or gold. In some cases, the conductive underlayer may be comprised of a combination of the stiffener layer of conductive material connected to the elongated conductive suspension member 19b. All description herein referring to the conductive underlayer 19 and the electrical connection assembly 15 as an "interleaved structure" or a "interleaved conductor structure" is understood to cover the use of either the stiffener layer of conductive material, the integrated elongated conductive suspension member 19b, or both the stiffener layer of conductive material connected to the elongated conductive suspension member 19b.

An electrical connection assembly 15 is disposed on the elongated conductive suspension member 19b and electrically connects the various components of the head 11 (write head, read head, etc.) to associated circuitry 13 located remote from the head 11. The electrical connection assembly 15 and the elongated conductive suspension member 19b form an interleaved conductor structure that supports the head 11 and the head slider 18 adjacent to the magnetic recording disk 14 and electrically connects the head 11 to the associated circuitry 13. It is to be understood that there are numerous mechanisms for the traces to end up at the read/write head such as: (i) down the side of flexure as shown in U.S. Pat. No. 6,351,348, which is incorporated by reference; (ii) around the outside as in shown in U.S. Patent Application Publication No. 2009/0244786, which is incorporated by reference; or (iii) down the middle of flexure as shown in FIG. 1.

Figure 2A:
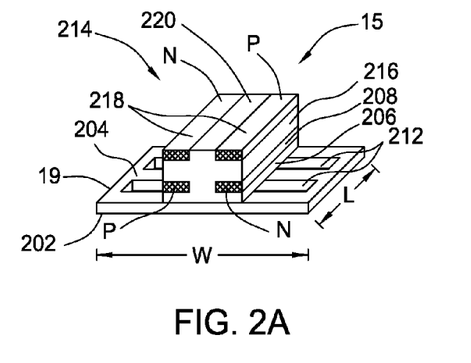
FIG. 2A-2E are cross sectional isometric views of an interleaved conductor structure according to various embodiments.

FIG. 2A shows a cross sectional isometric view of a portion of an interleaved conductor structure 214 that includes a conductive underlayer 19 as a supporting substrate for the electrical connection assembly 15. The conductive underlayer 19 has a bottom surface 202 (facing the magnetic disk 14), a top surface 204 (facing away from the magnetic disk 14) and a width W extending in the transverse direction of the actuator 16. The portion of the conductive underlayer 19 shown in FIGS. 2A-2E has a unit length L extending in the longitudinal direction of the actuator 16. In this embodiment, the electrical connection assembly 15 includes an electrical insulation layer 206 disposed on the top surface 204 of the conductive underlayer 19. A plurality (two in this embodiment) of electrical traces 208 is disposed on the electrical insulation layer 206. In some embodiments, the plurality of electrical traces 208 include at least one positive phase trace (labeled P), and at least one negative phase trace (labeled N). Write and read signals are coupled to and from the read/write head 11 as an electrical signal between the P and N traces. The plurality of electrical traces 208 are usually formed of a highly conductive material such as gold (Au) or copper (Cu). The electrical insulation layer 206 electrically isolates the plurality of electrical traces 208 from the conductive underlayer 19 and is formed of a dielectric material, which in some embodiments is a polymer such as polyimide.

In the embodiment of FIG. 2A, the conductive underlayer 19 includes a plurality of apertures or windows 212 formed therethrough from the bottom surface 202 to the top surface 204. The plurality of apertures 212 formed through the conductive underlayer 19 reduces the amount of lossy material in close proximity to the electrical connection assembly 15 and thereby reduces the amount of signal loss caused by the material of the conductive underlayer 19. While the apertures 212 are shown as extending completely through the conductive underlayer 19, in some embodiments, they may extend only partially through (similar to a blind bore) the conductive underlayer 19. In either embodiment, the reduced amount of lossy material reduces the amount of signal loss.

The conductive underlayer 19 of FIGS. 2A-2E has a unit area that is defined by its unit length L and its average width W along the unit length L. In some embodiments, the width may vary over the length of the conductive underlayer 19 as shown in FIG. 1, wherein the elongated conductive suspension member 19b tapers towards the head 11. The portion of the plurality of apertures 212 that are within the unit area form open regions that have a second area (the combined area of the openings) within the unit area. In one embodiment, the ratio of the area of the openings within the unit area to the total unit area of the conductive underlayer 19 is between about 1:1 and about 1:500. In embodiments where the plurality of apertures 212 have straight side walls (as shown in the figures), this ratio represents the percentage of material removed from the conductive underlayer 19. The removal of lossy material from the conductive underlayer 19 allows for the adjustment of the characteristic impedance to a desired level and reduces signal loss that is caused by the lossy material. The air/material ratio is not necessarily uniform along the entire length of the conductive underlayer 19, and in some embodiments may be varied to provide different characteristic impedances at different points along the length of the conductive underlayer 19. In addition, the shapes of the apertures 212 need not be rectangular as shown, and various shapes such as circular, ovoid, square, etc. are contemplated. It should also be noted that the electrical connection assembly 15 and the electrical insulation layer 206 disposed on the top surface 204 of the conductive underlayer 19 is not necessarily in the center of the conductive underlayer 19, as shown in the drawings, and may be closer to one longitudinal side or the other longitudinal side of the conductive underlayer 19. The apertures 212 also are not necessarily centered in the conductive underlayer 19, and in some embodiments extend only in those areas where the removal of the lossy material of the conductive underlayer 19 is advantageous, in particular under or proximate the electrical connection assembly 15.

Also in the embodiment of FIG. 2A, the electrical connection assembly 15 is in the form of a bi-layer interleave conductor structure (BICS). The BICS electrical connection assembly 15 includes an electrical insulation layer 206 that electrically isolates a first plurality of electrical traces 208 from the conductive underlayer 19. Above the first plurality of electrical traces 208 is a second electrical insulation layer 216 and a second plurality of electrical traces 218 such that a portion 220 of the second electrical insulating layer 216 is present between adjacent traces. The second plurality of electrical traces 218 includes at least one positive phase trace (labeled P), and at least one negative phase trace (labeled N). The positive phase trace and the negative phase trace of the second plurality of electrical traces 218 are reversed relative to the positive phase trace and the negative phase trace of the first plurality of electrical traces 208, to thereby form the BICS. By interleaving the signal lines in this manner, a wider range of the characteristic impedance can be achieved for a given insulator thickness. While only two layers of electrical traces are shown in FIG. 2A, it should be understood that the multiple interleaving layers can be replicated to reach the desired characteristic impedance level.

Figures 2B, 2C:
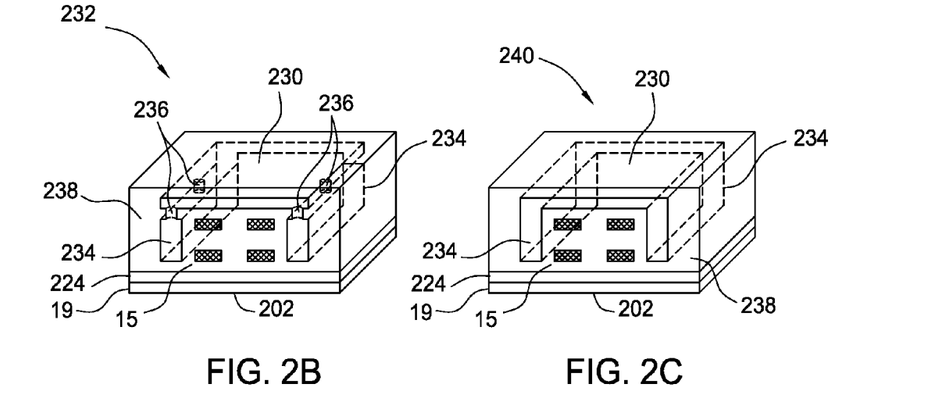

In FIG. 2B a cross sectional isometric view of one embodiment of an interleaved conductor structure 232 is shown. The interleaved conductor structure 232 provides shielding through the use of conductive sidewalls 234 that rest on the first conductive layer 224. The conductive sidewalls 234 are located on either side of the electrical connection assembly 15. In some embodiments, a plurality of spaced vias 236 formed through electrically insulating material are filled with electrically conductive material that electrically connects the conductive sidewalls 234 to a top conductive shield layer 230. It is to be understood that more or less vias may be utilized to have the same effect. Suitable conductive materials that may be used for the conductive sidewalls 234, conductive shield layer 230, first conductive layer 224, and electrically conductive material that fills vias 236 such as copper or a copper alloy. To fabricate the structure 232, an insulating layer is formed over the second plurality of electrical traces 218, the vias 236 are formed therethrough, the electrically conductive material then fills the vias 236, and finally the conductive shield layer 230 is deposited thereon. In one embodiment, the conductive sidewalls 234 and the top conductive shield layer 230 may be covered by an outer dielectric material 238. In one embodiment, a highly conductive first conductive layer 224 is disposed over the structure and is copper-based, although other highly conductive materials such as gold may be used. The first conductive layer 224 provides for low signal loss with a low impedance level from substrate coupling. The first conductive layer 224 may be used in conjunction with features from the various other embodiments of the interleaved conductor structure.

FIG. 2C depicts a cross sectional isometric view of a sixth embodiment of the interleaved conductor structure 240. The interleaved conductor structure 240 is substantially similar to the interleaved conductor structure 232 of FIG. 2B. However, in the interleaved conductor structure 240 the conductive sidewalls 234 extend completely to the top conductive shield layer 230, without the need for the plurality of vias 236. By extending the conductive sidewalls 234 to the top conductive shield layer 230, the electrical connection between the conductive sidewalls 234 and the top conductive shield layer 230 is improved, and a more continuous shield structure is formed.

Figures 2D, 2E:
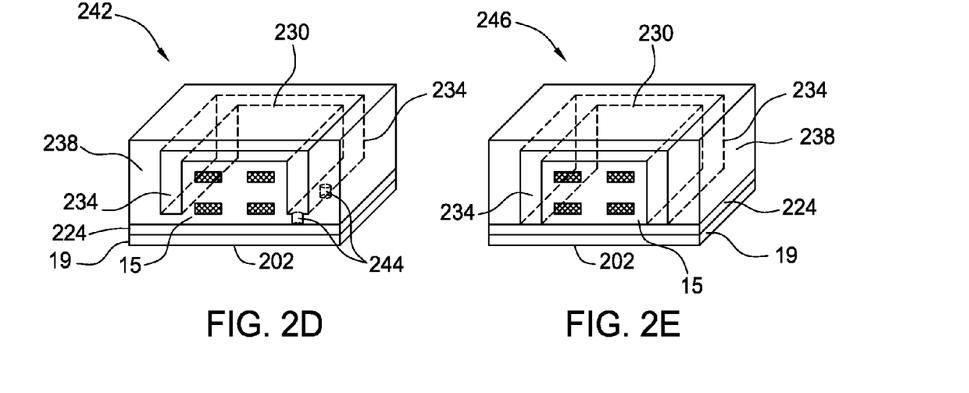

In FIG. 2D a cross sectional isometric view of a seventh embodiment of the interleaved conductor structure 242 is shown. The interleaved conductor structure 242 is substantially similar to the interleaved conductor structure 240 of FIG. 2C. However, in the interleaved conductor structure 242 a plurality of vias 244 electrically connects the conductive sidewalls 234 to the first conductive layer 224. In some embodiments, the first conductive layer 224 is omitted, and the vias 244 connect the conductive sidewalls 234 to the conductive underlayer 19. By electrically connecting the conductive sidewalls 234 (and the top conductive shield layer 230) to the underlying support, the shield structure is at the same electrical potential as the underlying support, thereby providing improved control of the characteristic impedance and improved shielding.

FIG. 2E depicts a cross sectional isometric view of an eighth embodiment of the interleaved conductor structure 246. The interleaved conductor structure 246 is substantially similar to the interleaved conductor structure 242 of FIG. 2D. However, in the interleaved conductor structure 246 of FIG. 2E the conductive sidewalls 234 extend to contact the first conductive layer 224, without the need for the plurality of vias 244. By extending the conductive sidewalls 234 to the first conductive layer 224, the electrical connection between the conductive sidewalls 234 and the first conductive layer 224 is improved, and a more continuous shield structure is formed. In some embodiments, the first conductive layer 224 is omitted, and the conductive sidewalls 234 extend to the conductive underlayer 19. In one embodiment, the interleaved conductor structure 246 provides a shield structure that completely surrounds the electrical connection assembly 15 similar to the shield in a coaxial cable.

Figure 3A:
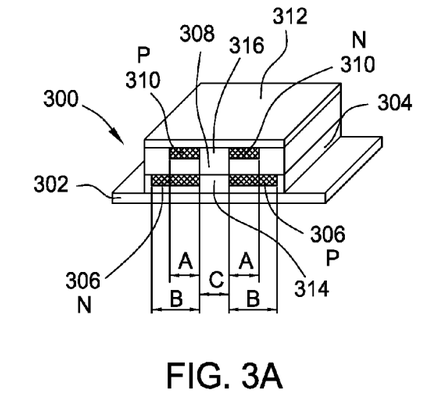
FIGS. 3A-3E are isometric views showing interleaved conductor structures according to various embodiments of the invention.

FIG. 3A is a schematic isometric view of an interleaved conductor structure 300 according to one embodiment. The structure 300 includes a bottom conductive layer 302 and a first electrical insulation layer 304 formed thereover. The first electrical insulation layer 302 may be patterned to form slots into which a first plurality of electrical traces 306 are formed. In the embodiment shown in FIG. 3A, there are two electrical traces 306 with one being a positive phase trace (labeled P) and one being a negative phase trace (labeled N). An area 314 of electrical insulation remains between the traces 306. A second electrical insulation layer 308 is formed over the first plurality of electrical traces 306. Similar to the first electrical insulation layer 304, the second electrical insulation layer 308 is patterned to form slots into which a second plurality of electrical traces 310 are formed. In the embodiment shown in FIG. 3A, there are two electrical traces 310 with one being a positive phase trace (labeled P) and one being a negative phase trace (labeled N). An area 316 of electrical insulation remains between the traces 310. A third electrical insulation layer 312 is formed over the second plurality of electrical traces 310.

The first plurality of electrical traces 306 have a first width B and the second plurality of electrical traces 310 have a second width A. The bottom or first plurality of electrical traces 306 are wider than the top or second plurality of electrical traces 310. The distance between adjacent traces of the first plurality of electrical traces 306 is substantially equal to the distance between adjacent traces of the second plurality of electrical traces 310 as shown by arrow C. The width of the traces 306, 310 is within about 30 percent to about 85 percent of each other. It is contemplated that the width of the traces 306, 310 may be within about 50 percent to about 75 percent of each other. In the embodiment shown in FIG. 3A, at least one edge of each trace of the second plurality of electrical traces 310 is vertically aligned with at least one edge of a trace of the first plurality of electrical traces 306 that is directly therebelow.

It can be quite difficult to produce traces of the exact same width on two different levels in which the edges are vertically aligned. Therefore, to increase the manufacturing tolerance, the second plurality of electrical traces 310 may simply be disposed over the first plurality of electrical traces 306 without regard to whether any edges are aligned. The second plurality of electrical traces 310 may be centered over the first plurality of electrical traces 306 rather than having at least one edge aligned. In the embodiment shown in FIG. 3A, the bottom or first plurality of electrical traces 306 has a greater width than the top or second plurality of electrical traces 310 so that the bottom or first plurality of electrical traces 306 may be used as a reference when forming the top or second plurality of electrical traces 310. It is contemplated that the top or second plurality of electrical traces 310 may be formed anywhere within the width of the first plurality of electrical traces 306. Even though the traces 306, 310 have different widths, there is no impedance dropoff. In particular, the impedance range for the structure 300 may be between about 10 ohm to about 40 ohm. While not shown, it is contemplated that the second plurality of electrical traces 310 may have a greater width than the first plurality of electrical traces 306.

Figure 3B:
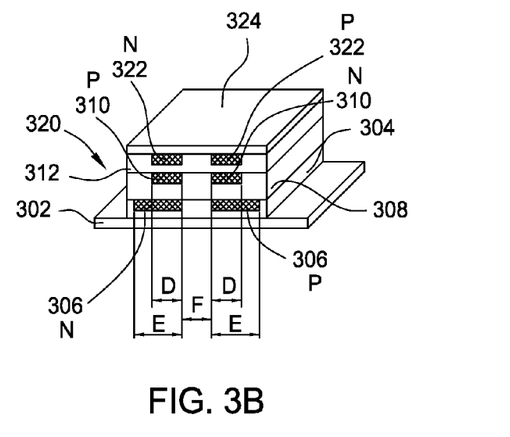
Figure 3C:
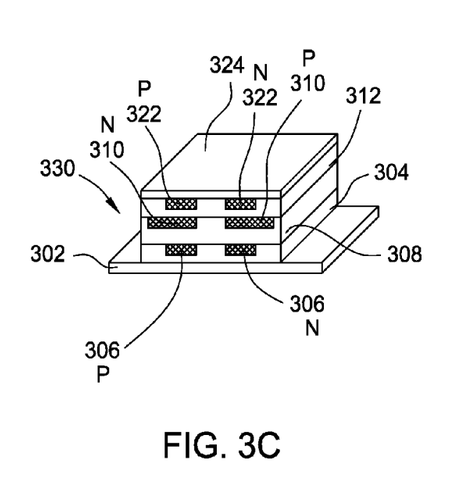
Figure 3D:
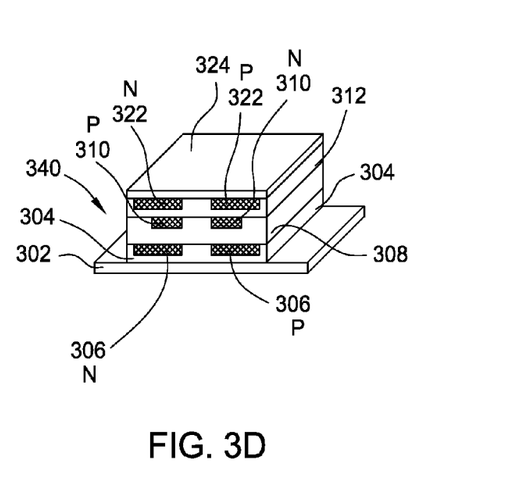

It is contemplated that more than two layers of traces may be utilized. FIGS. 3B-3D are schematic isometric illustrations of three layer trace structures. In FIG. 3B, the interleaved conductor structure 320 has a third plurality of electrical traces 322 formed above the third electrical insulation layer 312. A fourth electrical insulation layer 324 is formed thereover. In the embodiment of FIG. 3B, the first plurality of electrical traces 306 has a width E that is greater than the width of both the second plurality of electrical traces 310 and the third plurality of electrical traces 322. However, the second plurality of electrical traces 310 and the third plurality of electrical traces 322 have substantially the same width as shown by arrows D. Additionally, in the embodiment shown in FIG. 3B, at least one edge of all of the traces 306, 310, 322 is vertically aligned and thus, are spaced apart by substantially the same distance as shown by arrow F. Similar to FIG. 3A, the bottom or first plurality of electrical traces 306 has a greater width than both the second plurality of electrical traces 310 and the third plurality of electrical traces 322 so that the first plurality of electrical traces 306 may be used as a reference when forming the second plurality of electrical traces 310 and the third plurality of electrical traces 322. It is contemplated that the second plurality of electrical traces 310 and the third plurality of electrical traces 322 may be formed anywhere within the width of the first plurality of electrical traces 306.

In the embodiment shown in FIG. 3C, interleaved conductor structure 330 has three separate trace levels. The second plurality of electrical traces 310 has a greater width than both the first plurality of electrical traces 306 and the third plurality of electrical traces 322. The first plurality of electrical traces 306 and the third plurality of electrical traces 322 have substantially the same diameter and at least one edge of each trace is vertically aligned with another trace. Similar to FIG. 3B, the second plurality of electrical traces 310 may be used as a reference when forming the third plurality of electrical traces 322. It is contemplated that the first plurality of electrical traces 306 and the third plurality of electrical traces 322 may be formed anywhere within the width of the second plurality of electrical traces 310.

In the embodiment shown in FIG. 3D, the interleaved conductor structure 340 has three separate trace levels. The third plurality of electrical traces 322 and the first plurality of electrical traces 306 have a greater width than the second plurality of electrical traces 310. The first plurality of electrical traces 306 and the third plurality of electrical traces 322 have substantially the same diameter and at least one edge of each trace is vertically aligned with another trace. Similar to FIG. 3B, the first plurality of electrical traces 306 may be used as a reference when forming the second plurality of electrical traces 310 and the third plurality of electrical traces 322. It is contemplated that the second plurality of electrical traces 310 may be formed anywhere within the width of the second plurality of electrical traces 310.

Figure 3E:
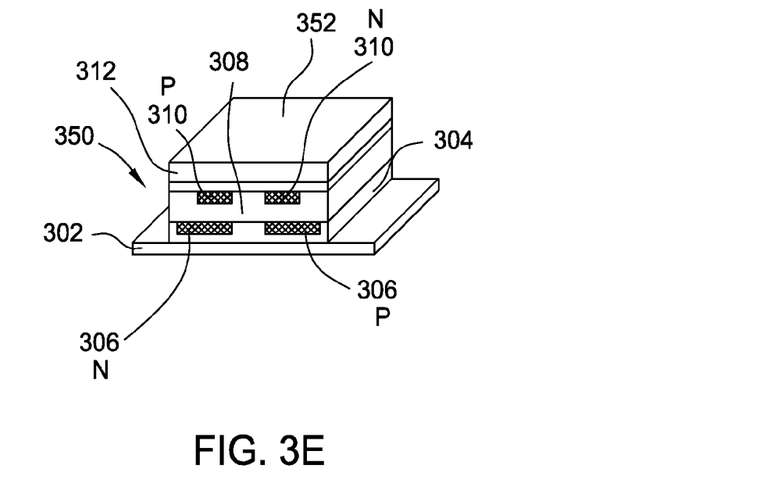

As shown in FIG. 3E, the interleaved conductor structure 350 may have a conductive overlayer 352 on top of an electrical insulation layer as has been described above. It is to be understood that each conductors structure discussed herein in each embodiment is contemplated to have one or more of a conductive overlayer 352, one or more apertures 212 formed through the conductive underlayer 19, vias 244, conductive sidewalls 234 and outer dielectric material 238 as described above. The conductive overlayer 352, the bottom conductive layer 302, the conductive sidewalls 234 each can individually function to shield the traces and to reduce the impedance.

Figure 3F:
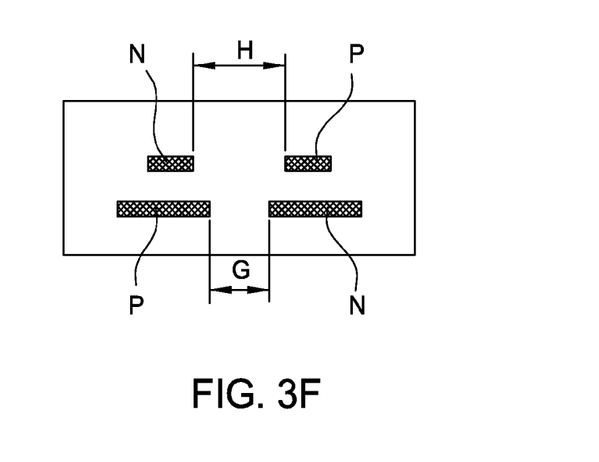
FIGS. 3F and 3G are schematic cross sectional views of interleaved conductor structures showing the spacing between adjacent traces.
Figure 3G:
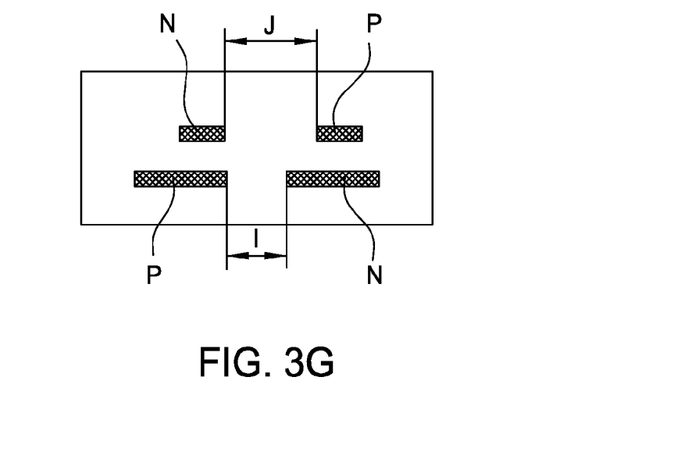

As shown by FIGS. 3F and 3G, the spacing between the traces for may be different. The first plurality of electrical traces 306 have a spacing G that is less than the spacing for the second plurality of electrical traces 310 as shown by H in FIG. 3F. However, the second plurality of traces 310 are each disposed within the width of a corresponding trace of the first plurality of traces 306. In FIG. 3G, the second plurality of traces 310 are again spaced a greater distance as shown by J as compared to the first plurality of traces 306 as shown by I. However, one of the traces of the second plurality of electrical traces 310 has an edge that is vertically aligned with an edge of a corresponding trace of the first plurality of electrical traces 306. Another trace of the second plurality of electrical traces 310 is substantially centered over a corresponding trace of the first plurality of electrical traces 306. It is to be understood that while FIGS. 3F and 3G refer to embodiments where the first plurality of electrical traces 306 have a greater width than the second plurality of electrical traces 310, the spacing differences apply equally to the situation where the first plurality of electrical traces 306 have a smaller width than the second plurality of electrical traces 310.

Figure 4A:
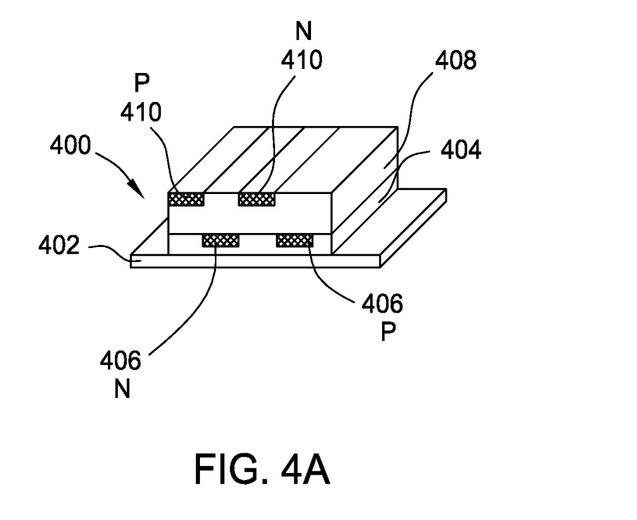
FIGS. 4A and 4B are isometric views showing interleaved conductor structures according to various embodiments of the invention.
Figure 4B:
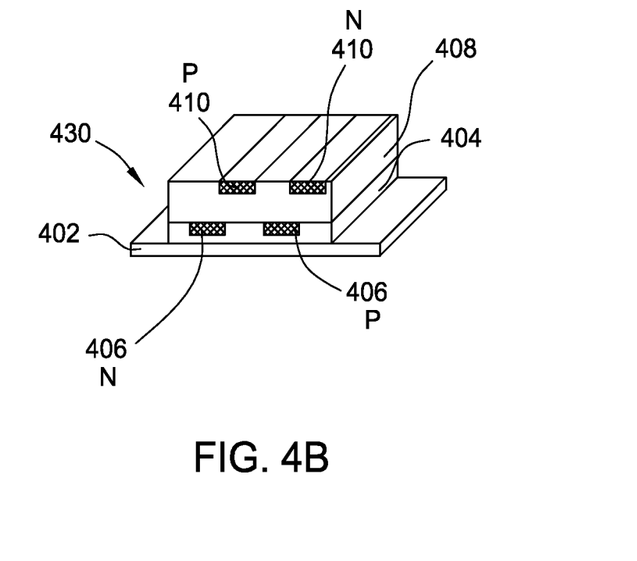

FIGS. 4A and 4B are isometric views showing interleaved conductor structures 400, 430 according to various embodiments of the invention. In FIGS. 4A and 4B, the traces at the different levels are offset and have a serpentine appearance.

FIGS. 4A and 4B show interleaved conductor structures 400, 430 having a bottom conductive layer 402, an electrical insulation layer 404 formed thereover, a first plurality of conductive traces 406 formed within a slot in the first electrical insulation layer 404, a second electrical insulation layer 408 formed over the first plurality of electrical traces 406, and a second plurality of electrical traces 410 formed within slots that are cut into the second electrical insulation layer 408. In each of FIGS. 4A and 4B, the second plurality of electrical traces 410 are offset from the first plurality of electrical traces 406.

Offsetting the second plurality of electrical traces 410 from the first plurality of electrical traces 406 increases the impedance range of the structures 400, 430 relative to structures in which the traces are not offset. More specifically, the offset provides a wider characteristic impedance range for the structures 400, 430. Offsetting the second plurality of electrical traces 410 from the first plurality of electrical traces 406 from center increases the impedance. The adjustability afforded by offsetting the traces allows for more control over the impedance in the final design of the structure 400, 430. In FIGS. 4A and 4B, the offset is periodic such that each trace pair has a different impedance level ($Z=sqrt(L/C)$) increasing the inductance (L), and decreasing the capacitance (C) between the second plurality of electrical traces 410 and the first plurality of electrical traces 406. Therefore, trace swapping between the second plurality of electrical traces 410 and the first plurality of electrical traces 406 is important to keep the desired impedance level. The impedance requirements in the final design of the hard drive could be altered by preamp/arm-electronics design specifications (e.g., to match the impedance), read-write head design specification (e.g., to match the impedance), scalability (e.g., different armature length between 3.5" and 2.5" drives), and the need for additional traces for the next generation drives (e.g., for the thermal fly-height control, thermal assisted writing, and thermal asperity detection). The periodic maximum trace length should be set to less than $\frac{1}{10}$ of the wavelength of the maximum symbol transfer rate; whereas the periodicity does not have a significant effect on the impedance levels for the required frequency range (symbol transfer). Lower periodic trance lengths would cause ripples in the time-domain response.

In the embodiments shown in FIGS. 4A and 4B, the first plurality of electrical traces 406 each have the same width. Similarly, the second plurality of electrical traces 410 each have the same width. The width of the first plurality of electrical traces 406 is substantially equal to the width of the second plurality of electrical traces 410. The distance between adjacent traces in the first plurality of electrical traces 406 is substantially equal to the width of each of the second plurality of electrical traces 410. Similarly, the distance between adjacent traces in the second plurality of electrical traces 410 is substantially equal to the width of each of the first plurality of electrical traces 406. Thus, any cross-talk effects are balanced. Additionally, the traces are vertically aligned along the edges.

Figure 5A:
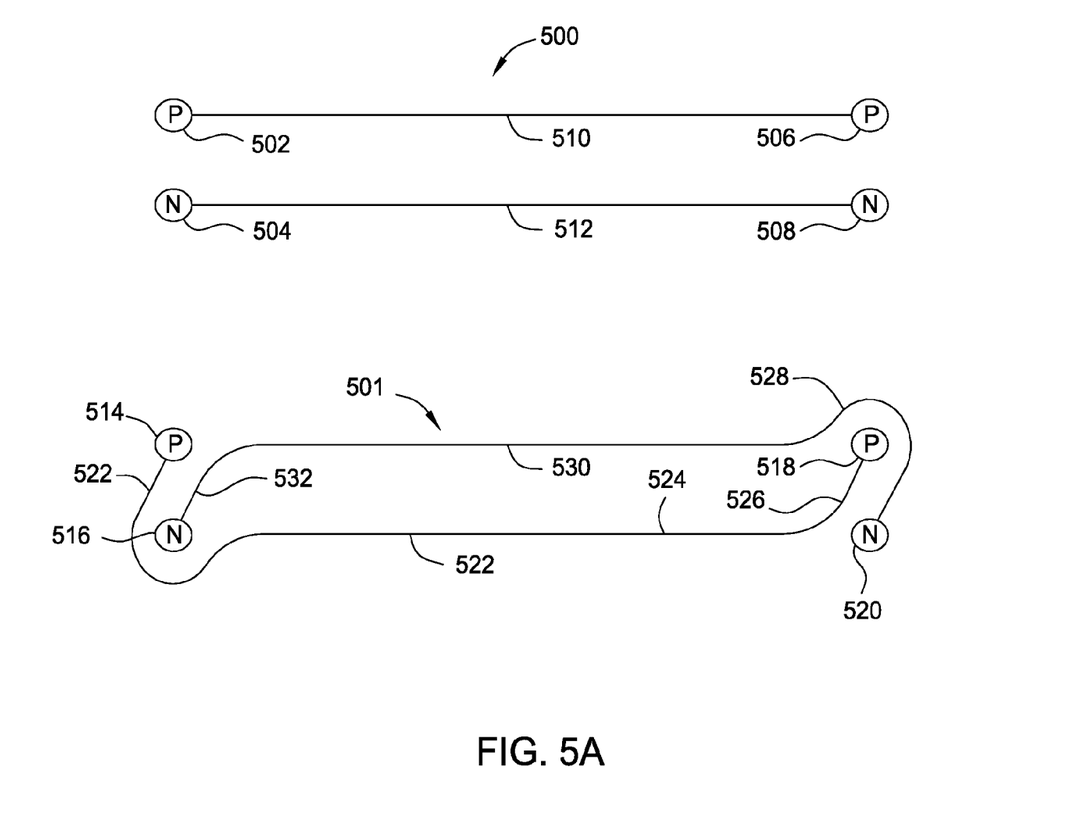
FIGS. 5A and 5B are schematic illustrations of the trace layout patterns according to various embodiments of the invention.
Figure 5B:
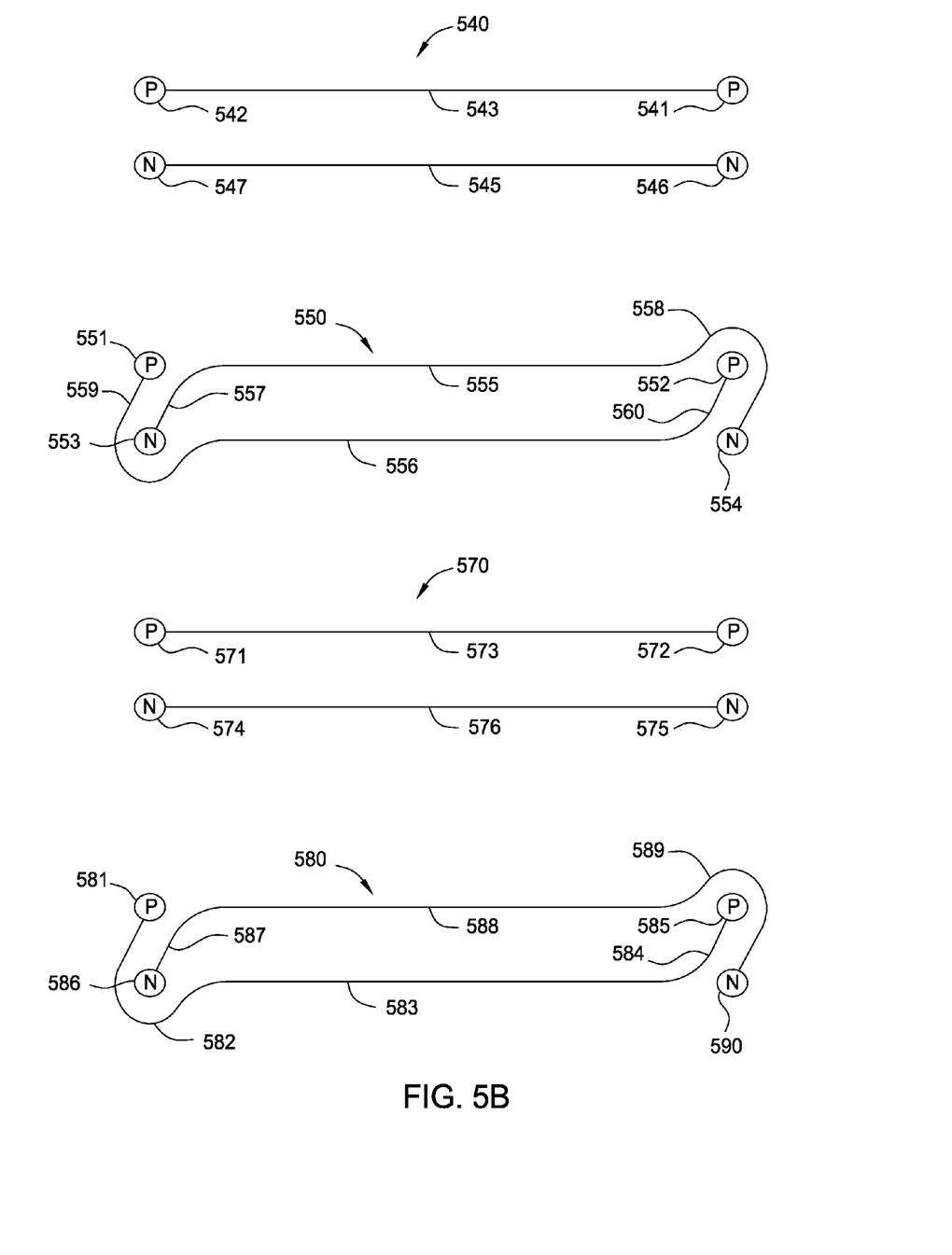

FIGS. 5A and 5B are schematic top view illustrations of trace layout patterns according to various embodiments of the invention. It is to be understood that the trace layout patterns shown in FIGS. 5A and 5B are applicable to the interleaved conductor structures discussed above. FIG. 5A shows a two level trace pattern. For the first plurality of electrical traces 500, the positive phase trace has two ends 502, 506 connected by a middle section 510. Similarly, the negative phase trace has two ends 504, 508 connected by a middle section 512. Over the first plurality of electrical traces 500, an insulating layer may be deposited over which the second plurality of electrical traces 501 is formed. The second plurality of conductive traces 501 includes a positive phase trace and a negative phase trace. The negative phase trace of the second plurality of electrical traces 501 is connected to the negative phase trace of the first plurality of electrical traces 500 at the ends 516, 520 to the ends 504, 508 of the negative phase trace of the first plurality of electrical traces 500. The ends 516, 520, 504, 508 are connected by vertical vias formed through the intervening layers. However, even though the negative phase trace of the second plurality of electrical traces 501 is connected to the negative phase trace of the first plurality of electrical traces 500, the middle section 530 of the negative phase trace of the second plurality of electrical traces 501 is vertically aligned with the middle section 510 of the positive trace of the first plurality of electrical traces 500. In order to vertically align the middle sections 530, 510, the negative phase trace of the second plurality of electrical traces 501 wraps around the end 518 of the positive phase trace of the second plurality of electrical traces 501 with a wrap around section 528 and the trace angles over by way of a slanted portion 532 to the middle section 530.

Similarly, the positive phase trace of the second plurality of electrical traces 501 is connected to the positive phase trace of the first plurality of electrical traces 500 at the ends 514, 518 to the ends 502, 506 of the positive phase trace of the first plurality of electrical traces 500. The ends 514, 518, 502, 506 are connected by vertical vias formed through the intervening layers. However, even though the positive phase trace of the second plurality of electrical traces 501 is connected to the positive phase trace of the first plurality of electrical traces 500, the middle section 522 of the positive phase trace of the second plurality of electrical traces 501 is vertically aligned with the middle section 512 of the negative phase trace of the first plurality of electrical traces 500. In order to vertically align the middle sections 522, 512, the positive phase trace of the second plurality of electrical traces 501 wraps around the end 516 of the negative phase trace of the second plurality of electrical traces 501 with a wrap around section 522 and the trace angles over by way of a slanted portion 526 to the middle section 522.

Thus, the negative phase trace of the second plurality of electrical traces 501 has one loop and one slanted portion. Similarly, the positive phase trace of the second plurality of electrical traces also has one loop and one slanted portion. Therefore, negative phase trace and the positive phase trace of the second plurality of electrical traces 501 have substantially the same length so that the impedance is balanced. By wrapping the ends of one trace around the end of a second trace that is at the same level, the end of one trace does not need to pass under or over the second trace. Of course, the second plurality of electrical traces 501 have a longer length than the first plurality of electrical traces 500. It is to be understood that the first plurality of electrical traces 500 and the second plurality of electrical traces 501 could be reversed such that the second plurality of electrical traces 501 are below the first plurality of electrical traces 500.

FIG. 5B shows a four level trace pattern. Similar to FIG. 5A, the first plurality of electrical traces 540 includes a positive phase trace having ends 541, 542 and a middle section 543 connecting the ends 541, 542. The first plurality of electrical traces 540 also includes a negative phase trace having ends 546, 547 as well as a middle section 545 connecting the ends 546, 547. Over the first plurality of electrical traces 540, an insulating layer may be deposited over which the second plurality of electrical traces 550 is formed. The second plurality of conductive traces 550 includes a positive phase trace and a negative phase trace. The negative phase trace of the second plurality of electrical traces 550 is connected to the negative phase trace of the first plurality of electrical traces 540 at the ends 553, 554 to the ends 546, 547 of the negative phase trace of the first plurality of electrical traces 550. The ends 546, 547, 553, 554 are connected by vertical vias formed through the intervening layers. However, even though the negative phase trace of the second plurality of electrical traces 550 is connected to the negative phase trace of the first plurality of electrical traces 540, the middle section 555 of the negative phase trace of the second plurality of electrical traces 550 is vertically aligned with the middle section 543 of the positive trace of the first plurality of electrical traces 540. In order to vertically align the middle sections 555, 543, the negative phase trace of the second plurality of electrical traces 550 wraps around the end 551 of the positive phase trace of the second plurality of electrical traces 550 with a wrap around section 558 and the trace angles over by way of a slanted portion 557 to the middle section 555.

Similarly, the positive phase trace of the second plurality of electrical traces 550 is connected to the positive phase trace of the first plurality of electrical traces 540 at the ends 551, 552 to the ends 541, 542 of the positive phase trace of the first plurality of electrical traces 540. The ends 541, 542, 551, 552 are connected by vertical vias formed through the intervening layers. However, even though the positive phase trace of the second plurality of electrical traces 550 is connected to the positive phase trace of the first plurality of electrical traces 540, the middle section 556 of the positive phase trace of the second plurality of electrical traces 550 is vertically aligned with the middle section 545 of the negative phase trace of the first plurality of electrical traces 540. In order to vertically align the middle sections 556, 545, the positive phase trace of the second plurality of electrical traces 550 wraps around the end 553 of the negative phase trace of the second plurality of electrical traces 550 with a wrap around section 559 and the trace angles over by way of a slanted portion 560 to the middle section 556.

Over the second plurality of electrical traces 550, another insulation layer may be deposited. Thereover, a third plurality of electrical traces 570 may be formed. The third plurality of electrical traces 570 includes a positive phase trace having ends 571, 572 connected by a middle section 573. The positive phase trace is vertically aligned with the positive phase trace of the first plurality of electrical traces 540 and connected thereto at the ends 571, 572, 541, 542 through vias formed through intervening layers. The positive phase trace is also connected to the ends 551, 552 of the positive phase trace of the second plurality of electrical traces 550. Similarly, the third plurality of electrical traces 570 includes a negative phase trace having ends 574, 575 connected by a middle section 576. The negative phase trace is vertically aligned with the negative phase trace of the first plurality of electrical traces 540 and connected thereto at the ends 574, 575, 547, 546 through vias formed through intervening layers. The negative phase race is also connected to the ends 557, 558 of the negative phase trace of the second plurality of electrical traces 550.

Over the third plurality of electrical traces 570, an insulating layer may be deposited over which the fourth plurality of electrical traces 580 is formed. The fourth plurality of conductive traces 580 includes a positive phase trace and a negative phase trace. The negative phase trace of the fourth plurality of electrical traces 580 is connected to the negative phase trace of the third plurality of electrical traces 570 at the ends 586, 590 to the ends 574, 575 of the negative phase trace of the third plurality of electrical traces 570. The ends 574, 575, 586, 590 are connected by vertical vias formed through the intervening layers. However, even though the negative phase trace of the fourth plurality of electrical traces 580 is connected to the negative phase trace of the third plurality of electrical traces 570, the middle section 588 of the negative phase trace of the fourth plurality of electrical traces 580 is vertically aligned with the middle section 573 of the positive trace of the third plurality of electrical traces 570. In order to vertically align the middle sections 588, 573, the negative phase trace of the fourth plurality of electrical traces 580 wraps around the end 585 of the positive phase trace of the fourth plurality of electrical traces 580 with a wrap around section 589 and the trace angles over by way of a slanted portion 587 to the middle section 588.

Similarly, the positive phase trace of the fourth plurality of electrical traces 580 is connected to the positive phase trace of the third plurality of electrical traces 570 at the ends 581, 585 to the ends 571, 572 of the positive phase trace of the third plurality of electrical traces 570. The ends 571, 572, 571, 585 are connected by vertical vias formed through the intervening layers. However, even though the positive phase trace of the fourth plurality of electrical traces 580 is connected to the positive phase trace of the third plurality of electrical traces 570, the middle section 583 of the positive phase trace of the fourth plurality of electrical traces 580 is vertically aligned with the middle section 576 of the negative phase trace of the third plurality of electrical traces 570. In order to vertically align the middle sections 583, 576, the positive phase trace of the fourth plurality of electrical traces 580 wraps around the end 586 of the negative phase trace of the fourth plurality of electrical traces 580 with a wrap around section 582 and the trace angles over by way of a slanted portion 585 to the middle section 583.

In FIG. 5B, the positive phase traces of both the first plurality of electrical traces 540 and the third plurality of electrical traces 570 are vertically aligned and have substantially the same length. Similarly, the negative phase traces of both the first plurality of electrical traces 540 and the third plurality of electrical traces 570 are vertically aligned and have substantially the same length. The positive phase traces of both the second plurality of electrical traces 550 and the fourth plurality of electrical traces 580 are vertically aligned and have substantially the same length. Similarly, the negative phase traces of both the second plurality of electrical traces 550 and the fourth plurality of electrical traces 580 are vertically aligned and have substantially the same length. Both the positive phase trace and the negative phase trace of the first plurality of electrical traces 540 have substantially the same length and thus, substantially the same impedance. Both the positive phase trace and the negative phase trace of the second plurality of electrical traces 550 have substantially the same length and thus, substantially the same impedance. Both the positive phase trace and the negative phase trace of the third plurality of electrical traces 570 have substantially the same length and thus, substantially the same impedance. Both the positive phase trace and the negative phase trace of the fourth plurality of electrical traces 580 have substantially the same length and thus, substantially the same impedance.

While the foregoing is directed to embodiments of the present invention, other and further embodiments of the invention may be devised without departing from the basic scope thereof, and the scope thereof is determined by the claims that follow.

What is claimed is:

1. An interleaved conductor structure for electrically connecting between the read/write electronics and a head and head slider adjacent to a magnetic recording disk, the interleaved conductor structure comprising:
a conductive underlayer;
a first electrical insulation layer disposed over the conductive underlayer;
a first plurality of electrical traces disposed on the first electrical insulation layer and spaced apart from each other by a first distance, each electrical trace of the first plurality of electrical traces having a first width;
a second electrical insulation layer disposed on the first plurality of electrical traces; and
a second plurality of electrical traces disposed on the second electrical insulation layer and spaced apart from each other by a second distance that is substantially equal to the first distance, each electrical trace of the second plurality of electrical traces has a second width, wherein each electrical trace of the second plurality of electrical traces is offset from each electrical trace of the first plurality of electrical traces, wherein the first and second plurality of electrical traces each include negative and positive phase traces, wherein the first plurality of electrical traces are interleaved relative to the second plurality of electrical traces, and wherein a periodic maximum trace length is less than 1/10 of the wavelength of a maximum symbol transfer rate.

2. The interleaved conductor structure of claim 1, wherein the second width is substantially equal to the first distance.

3. The interleaved conductor structure of claim 1, wherein the first width is different than the second width.

4. The interleaved conductor structure of claim 1, wherein each electrical trace of the second plurality of electrical traces is offset from a corresponding electrical trace of the first plurality of electrical traces by a substantially equal distance.

5. The interleaved conductor structure of claim 4, further comprising a first conductive layer disposed between the conductive underlayer and the first electrical insulation layer.

6. The interleaved conductor structure of claim 5, wherein the first conductive layer comprises a highly conductive material chosen from the group consisting of gold (Au) and copper (Cu).

7. The interleaved conductor structure of claim 1, wherein the conductive underlayer has at least one aperture extending therethrough.

8. The interleaved conductor structure of claim 1, further comprising a first conductive layer disposed between the conductive underlayer and the first electrical insulation layer.

9. The interleaved conductor structure of claim 8, further comprising a second conductive layer disposed over the second plurality of electrical traces.

10. The interleaved conductor structure of claim 9, wherein the first conductive layer and the second conductive layer each comprise a highly conductive material chosen from the group consisting of gold (Au) and copper (Cu).

11. The interleaved conductor structure of claim 1, wherein the first width is equal to the second width.

12. The interleaved conductor structure of claim 1, wherein the offset of the second plurality of electrical traces relative to the first plurality of electrical traces is periodic to create a serpentine appearance.

13. The interleaved conductor structure of claim 1, wherein each trace of the second plurality of electrical traces is offset from a corresponding trace of the first plurality of electrical traces by a substantially equal distance.

14. The interleaved conductor structure of claim 1, wherein the conductive underlayer is a stiffener layer of conductive material.

15. The interleaved conductor structure of claim 1, wherein the conductive underlayer is an elongated conductive suspension member.

16. An interleaved conductor structure for electrically connecting between the read/write electronics and a head and head slider adjacent to a magnetic recording disk, the interleaved conductor structure comprising:
- a conductive underlayer;
- a first electrical insulation layer disposed over the conductive underlayer;
- a first plurality of electrical traces disposed on the first electrical insulation layer and spaced apart by a first distance, each electrical trace of the first plurality of electrical traces having a first width;
- a second electrical insulation layer disposed on the first plurality of electrical traces;
- a second plurality of electrical traces disposed on the second electrical insulation layer and spaced apart by a second distance substantially equal to the first distance, each electrical trace of the second plurality of electrical traces has a second width, wherein each electrical trace of the second plurality of electrical traces is offset from each electrical trace of the first plurality of electrical traces, wherein the first and second plurality of electrical traces each include negative and positive phase traces, wherein the first plurality of electrical traces are interleaved relative to the second plurality of electrical traces, and wherein a periodic maximum trace length is less than $1/10$ of the wavelength of a maximum symbol transfer rate;
- a third electrical insulation layer disposed on the second plurality of electrical traces; and
- a top conductive shield layer disposed on the third electrical insulation layer.

17. The interleaved conductor structure of claim 16, further comprising a first conductive layer disposed between the conductive underlayer and the first electrical insulation layer.

18. The interleaved conductor structure of claim 17, wherein the first conductive layer comprises a highly conductive material chosen from the group consisting of gold (Au) and copper (Cu).

19. The interleaved conductor structure of claim 16, wherein the conductive underlayer has at least one aperture extending therethrough.

20. The interleaved conductor structure of claim 16, wherein the second width is substantially equal to the first distance.

21. The interleaved conductor structure of claim 19, wherein the first width is different than the second width.

22. The interleaved conductor structure of claim 16, wherein the offset of the second plurality of electrical traces relative to the first plurality of electrical traces is periodic to create a serpentine appearance.

23. The interleaved conductor structure of claim 16, wherein each trace of the second plurality of electrical traces is offset from a corresponding trace of the first plurality of electrical traces by a substantially equal distance.

24. The interleaved conductor structure of claim 16, wherein the conductive underlayer is a stiffener layer of conductive material.

25. The interleaved conductor structure of claim 16, wherein the conductive underlayer is an elongated conductive suspension member.

26. An interleaved conductor structure for electrically connecting between the read/write electronics and a head and head slider adjacent to a magnetic recording disk, the interleaved conductor structure comprising:
- a conductive underlayer having at least one aperture extending therethrough;
- a first conductive layer disposed on the conductive underlayer;
- a first electrical insulation layer disposed on the first conductive layer;
- a first plurality of electrical traces disposed on the first electrical insulation layer and spaced apart by a first distance, each electrical trace of the first plurality of electrical traces having a first width;
- a second electrical insulation layer disposed on the first plurality of electrical traces;
- a second plurality of electrical traces disposed on the second electrical insulation layer and spaced apart by a second distance substantially equal to the first distance, each electrical trace of the second plurality of electrical traces has a second width, wherein each electrical trace of the second plurality of electrical traces is offset from each electrical trace of the first plurality of electrical traces, wherein the first and second plurality of electrical traces each include negative and positive phase traces, wherein the first plurality of electrical traces are interleaved relative to the second plurality of electrical traces, and wherein a periodic maximum trace length is less than $1/10$ of the wavelength of a maximum symbol transfer rate;
- a third electrical insulation layer disposed on the second plurality of electrical traces; and
- a top conductive shield layer disposed on the third electrical insulation layer.

27. The interleaved conductor structure of claim 26, wherein the first conductive layer comprises a highly conductive material chosen from the group consisting of gold (Au) and copper (Cu).

28. The interleaved conductor structure of claim 27, wherein the second width is substantially equal to the first distance.

29. The interleaved conductor structure of claim 26, wherein the offset of the second plurality of electrical traces relative to the first plurality of electrical traces is periodic to create a serpentine appearance.

30. The interleaved conductor structure of claim 26, wherein each trace of the second plurality of electrical traces is offset from a corresponding trace of the first plurality of electrical traces by a substantially equal distance.

31. The interleaved conductor structure of claim 26, wherein the conductive underlayer is a stiffener layer of conductive material.

32. The interleaved conductor structure of claim 26, wherein the conductive underlayer is an elongated conductive suspension member.

* * * * *